US012774914B2

(12) United States Patent
Ishikawa et al.

(10) Patent No.: US 12,774,914 B2
(45) Date of Patent: Oct. 27, 2026

(54) INTRINSICALLY SAFE EXPLOSION-PROOF LEVEL METER

(71) Applicant: Keyence Corporation, Osaka (JP)

(72) Inventors: Daishiro Ishikawa, Osaka (JP); Kosuke Sato, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 306 days.

(21) Appl. No.: 18/785,131

(22) Filed: Jul. 26, 2024

(65) Prior Publication Data

US 2025/0102344 A1 Mar. 27, 2025

(30) Foreign Application Priority Data

Sep. 25, 2023 (JP) ................................ 2023-159393

(51) Int. Cl.
*G01F 23/284* (2006.01)

(52) U.S. Cl.
CPC .................................. *G01F 23/284* (2013.01)

(58) Field of Classification Search
CPC ............................... G01F 23/284; G01F 23/00
See application file for complete search history.

(56) References Cited

U.S. PATENT DOCUMENTS 5,614,672 A * 3/1997 Legendre ............ G01F 23/0038 73/437
5,710,552 A * 1/1998 McCoy ................. G01F 23/284 340/662
5,877,663 A * 3/1999 Palan ..................... H01Q 19/08 333/252
5,926,080 A * 7/1999 Palan ........................ H01P 1/08 333/252
6,366,436 B1 * 4/2002 Maier ..................... G01F 15/06 73/35.14

(Continued)

FOREIGN PATENT DOCUMENTS

JP 2014002091 A 1/2014

OTHER PUBLICATIONS

U.S. Appl. No. 18/605,908, filed Mar. 15, 2024 (54 pages).

(Continued)

*Primary Examiner* — David J Bolduc
(74) *Attorney, Agent, or Firm* — Kilyk & Bowersox, P.L.L.C.

(57) ABSTRACT

Provided is an intrinsically safe explosion-proof level meter that can be simplified in design. An intrinsically safe explosion-proof level meter includes a level meter main body and a power supply path to measure a level of an object stored in a container. The level meter main body includes a transmission circuit, a reception circuit, a level determination unit, an operation switch, and a display. The transmission circuit transmits the measurement signal. The level determination unit determines the level based on the measurement signal received by the reception circuit and the information on the container. The display displays the determined level. The power supply path has an intrinsically safe explosion-proof barrier that prevents the level meter main body from becoming an ignition source, and a pressure-resistant explosion-proof box that accommodates the intrinsically safe explosion-proof barrier.

14 Claims, 11 Drawing Sheets

(56) References Cited

U.S. PATENT DOCUMENTS

| | | | | |
|---|---|---|---|---|
| 2009/0114012 | A1* | 5/2009 | Becherer | G01F 23/02<br>73/325 |
| 2017/0164494 | A1* | 6/2017 | Duivenvoorden | G01F 23/284 |

OTHER PUBLICATIONS

U.S. Appl. No. 18/605,909, filed Mar. 15, 2024 (60 pages).
U.S. Appl. No. 18/605,916, filed Mar. 15, 2024 (61 pages).
U.S. Appl. No. 18/785,058, filed Jul. 26, 2024 (104 pages).
U.S. Appl. No. 18/785,075, filed Jul. 26, 2024 (80 pages).
U.S. Appl. No. 18/785,095, filed Jul. 26, 2024 (56 pages).

* cited by examiner

INTRINSICALLY SAFE EXPLOSION-PROOF LEVEL METER

CROSS-REFERENCE TO RELATED APPLICATIONS

The present application claims foreign priority based on Japanese Patent Application No. 2023-159393, filed Sep. 25, 2023, the contents of which are incorporated herein by reference.

BACKGROUND OF THE INVENTION

1. Technical Field

The present invention relates to an intrinsically safe explosion-proof level meter.

2. Description of the Related Art

JP 2014-002091 A discloses a level meter.

The level meter described in JP 2014-002091 A can easily identify an actual stored amount of an object (medium) stored in a container.

Incidentally, it is conceivable that the level meter described in JP 2014-002091 A has a pressure-resistant explosion-proof structure in a case where the level meter is disposed in an explosion-proof dangerous place. In the pressure-resistant explosion-proof structure, it is necessary to cover the level meter described in JP 2014-002091 A with a pressure-resistant explosion-proof housing. In such a level meter, a pressure-resistant explosion-proof housing is an obstacle, and visibility of display is poor or operability is low.

Therefore, it is conceivable that the level meter described in JP 2014-002091 A has an intrinsically safe explosion-proof structure instead of the pressure-resistant explosion-proof structure. An inherently safe structure is a structure that uses an intrinsically safe electrical circuit (an intrinsically safe circuit) that does not become an ignition source in a normal state and a specific failure state. The intrinsically safe device is divided into an intrinsically safe device in which all the circuits are composed of an intrinsically safe circuit and can be used in a dangerous place and an intrinsically safe-related device in which a part of the circuits is composed of an intrinsically safe circuit and is installed in a safe place and connected to the intrinsically safe device. In the intrinsically safe explosion-proof structure, an intrinsically safe explosion-proof barrier that is an intrinsically safe-related device is connected to a level meter that is an intrinsically safe device. A level meter connected to an intrinsically safe explosion-proof barrier does not serve as an ignition source and thus does not need to be covered with a pressure-resistant explosion-proof housing.

However, in the intrinsically safe explosion-proof structure, it is necessary to connect a level meter and an intrinsically safe explosion-proof barrier by an intrinsically safe dedication wiring. The intrinsically safe dedication wiring cannot utilize existing wiring to prevent electromagnetic induction, electrostatic induction, and interference from other circuits. Furthermore, the intrinsically safe dedication wiring is inevitably long, since the level meter is arranged in a dangerous place and the intrinsically safe explosion-proof barrier is arranged in a safe place. Therefore, in a case where the level meter described in JP 2014-002091 A has an intrinsically safe explosion-proof structure, the design becomes complicated.

SUMMARY OF THE INVENTION

The present invention has been made in view of the above problems, and an object thereof is to provide a level meter having high visibility and operability while simplifying installation and wiring in an explosion-proof structure.

According to an aspect of the present invention, an intrinsically safe explosion-proof level meter measures a level of an object stored in a container. The intrinsically safe explosion-proof level meter includes a level meter main body and a power supply path. The level meter main body includes a transmission circuit, a reception circuit, a level determination unit, an operation switch, and a display portion. The transmission circuit transmits a measurement signal for measuring the level of the object. The reception circuit receives the measurement signal reflected by the object. The level determination unit determines the level based on the measurement signal received by the reception circuit and the information on the container. The operation switch receives an input operation of setting information. The display portion displays the level determined by the level determination unit. The setting information includes information on the container and a threshold for the level determined by the level determination unit. The power supply path supplies power to the level meter main body. The power supply path has an intrinsically safe explosion-proof barrier and a pressure-resistant explosion-proof box. An intrinsically safe explosion-proof barrier prevents the level meter main body from becoming an ignition source. The pressure-resistant explosion-proof box accommodates an intrinsically safe explosion-proof barrier.

According to the intrinsically safe explosion-proof level meter of the present invention, the design can be simplified.

BRIEF DESCRIPTION OF THE DRAWINGS

FIG. 6 is modified;

DETAILED DESCRIPTION

Figure 1:
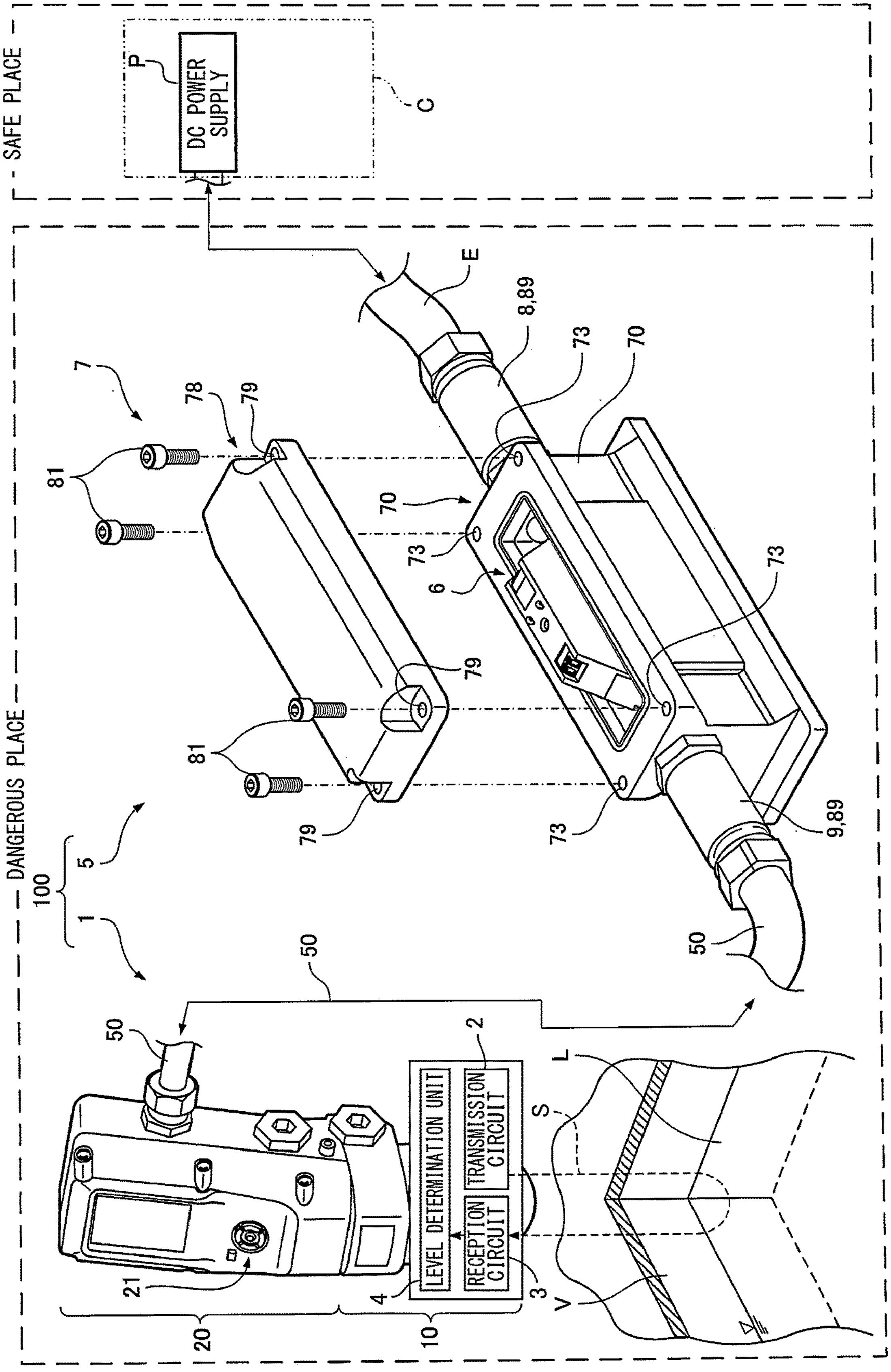
FIG. 1 is a schematic perspective view of an intrinsically safe explosion-proof level meter.

Note that, in the drawings, the same or corresponding portions are denoted by the same reference numerals, and the description thereof will not be repeated. In addition, in the following description, a term meaning a position or a direction may be used. These terms are used for convenience to facilitate understanding of the embodiments, and are not limited to positions or directions in a strict sense unless otherwise expressly stated.

Hereinafter, with reference to FIGS. 1 to 11, an intrinsically safe explosion-proof level meter 100 according to an embodiment of the present invention will be described.

First, an outline of the intrinsically safe explosion-proof level meter 100 will be described with reference to FIG. 1. FIG. 1 is a schematic perspective view of the intrinsically safe explosion-proof level meter 100.

As illustrated in FIG. 1, the intrinsically safe explosion-proof level meter 100 measures the level of an object L stored in a container V. The intrinsically safe explosion-proof level meter 100 includes a level meter main body 1 and a power supply path 5.

The level meter main body 1 includes a transmission circuit 2, a reception circuit 3, a level determination unit 4, an operation switch 21, and a display portion 20.

The transmission circuit 2 transmits a measurement signal S for measuring the level of the object L. The reception circuit 3 receives the measurement signal S reflected by the object L. The level determination unit 4 determines a level based on the measurement signal S received by the reception circuit 3 and the information on the container V.

The operation switch 21 receives an input operation of setting information. The display portion 20 displays the level determined by the level determination unit 4. The setting information includes information on the container V. The setting information may include a threshold for the level determined by the level determination unit 4.

Figure 2:
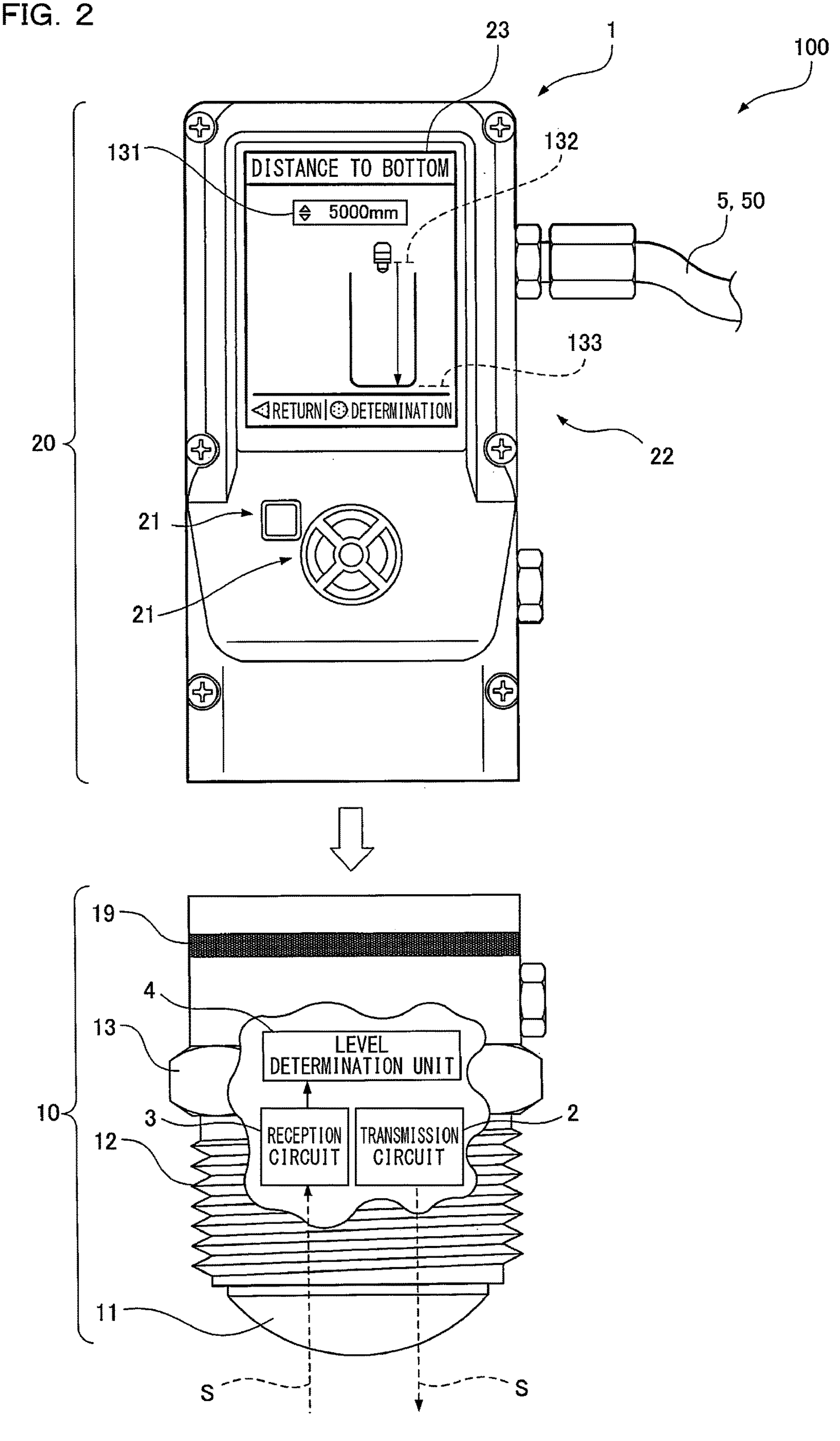
FIG. 2 is a front view of a state in which a display portion of a level meter main body displays a bottom distance setting screen.

In a case where the information on the container V is set, a bottom distance setting screen 23 is displayed on the display portion 20 as illustrated in FIG. 2. On the bottom distance setting screen 23, the distance from a measurement reference surface 132 of the level meter main body 1 to a bottom 133 of the container V is set. In a bottom distance setting field 131, candidates for the distance to the bottom 133 are displayed as numerical values. When the user operates the operation switch 21 indicating the increase or decrease on the bottom distance setting screen 23, the numerical value displayed in the bottom distance setting field 131 decreases and increases. Then, when the operation switch 21 indicating determination is operated by the user, a numerical value (for example, 5000 mm) displayed in the bottom distance setting field 131 is set in the level meter main body 1. The level determination unit 4 determines the level of the object L based on the distance to the object L based on the measurement signal S received by the reception circuit 3 and the distance to the bottom of the container V as the information of the container V. For example, the level determination unit 4 determines a value obtained by subtracting the distance to the object L from the distance to the bottom of the container V as the level of the object L.

The level meter main body 1 outputs information indicating the level of the object L determined by the level determination unit 4 to an external device via the power supply path 5. The level meter main body 1 may output an analog signal indicating a level as information indicating a level, or may output information indicating a level by communication. In addition, the level meter main body 1 may output a comparison result with one or a plurality of thresholds set for the level of the object L determined by the level determination unit 4 to an external device as information indicating the level. When the operation switch 21 is operated by the user, a threshold is set for the level of the object L. The level meter main body 1 includes an indicator lamp 19 that displays a state of the level based on a comparison result between the level of the object L determined by the level determination unit 4 and a set threshold.

The level meter main body 1 may be a two-wire type in which an analog signal indicating the level of the object L determined by the level determination unit 4 or communication information indicating the level is output while superimposed on a power supply line.

The bottom distance setting screen 23 and the like are displayed on the display portion 20 by a display 23, which will be described in detail later. The display 23 is, for example, a liquid crystal display (LCD) display. Since the display 23 is an LCD display, the power of expression is increased, so that the visibility of the user is improved.

Figure 11:
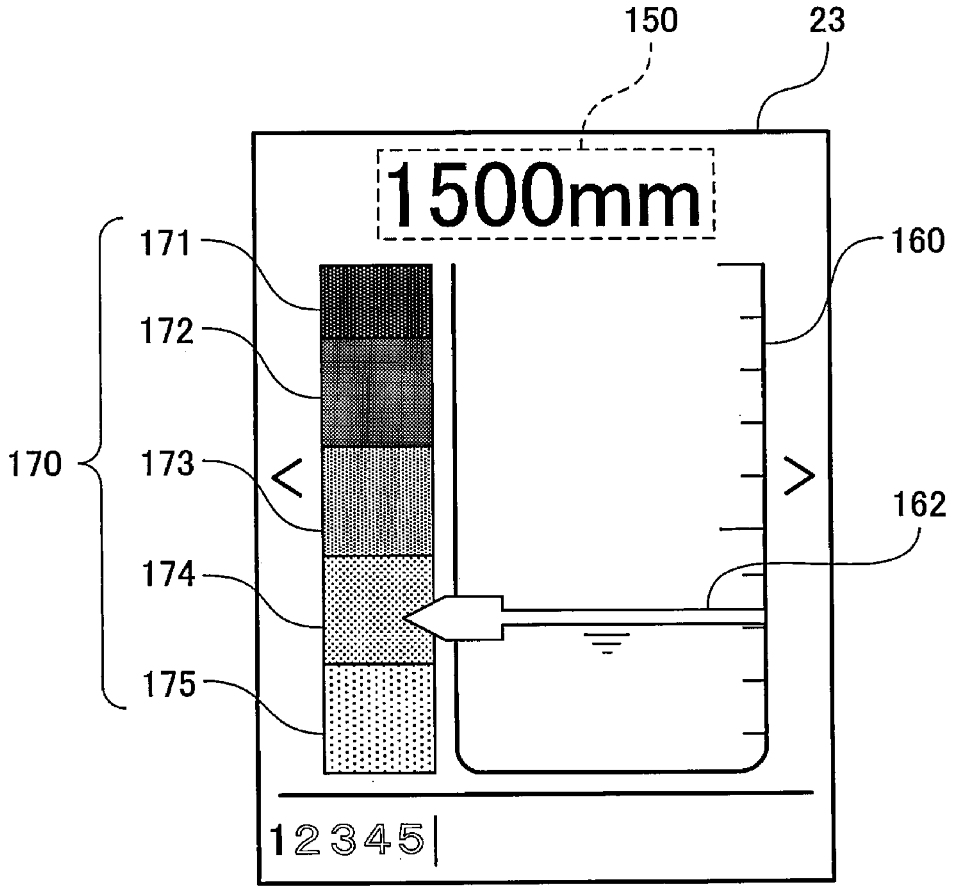
FIG. 11 is a display screen of a display for displaying a determined level.

Since the display 23 can perform level graph display and color display, the level state can be displayed by a color gauge 170 (see FIG. 11). Since the level state is displayed on the color gauge 170 (see FIG. 11), the visibility of the user is improved.

The indicator lamp 19 described above may be a ring indicator lamp arranged circumferentially so as to surround the axis of the level meter main body 1. Since the indicator lamp 19 is a ring indicator lamp, the indicator lamp 19 notifies the display in a wide range, so that the visibility of the user is improved. The indicator lamp 19 may be disposed between the display portion 20 and an attachment portion 13 (described later), but may be disposed in another portion such as an upper end portion of the display portion 20. The indicator lamp 19 is turned on or off in different colors according to the level determined by the level determination unit 4. The color of the indicator lamp 19 is not particularly limited, and is, for example, green, yellow, and red. Specifically, in a case where the determined level is within the standard range, the indicator lamp 19 lights green. In a case where the determined level is within the range requiring warning, the indicator lamp 19 lights yellow. In a case where the determined level is within the dangerous range, the indicator lamp 19 lights red.

As illustrated in FIG. 1, the power supply path 5 supplies power to the level meter main body 1. The power supply path 5 includes an intrinsically safe explosion-proof barrier 6 and a pressure-resistant explosion-proof box 7.

The intrinsically safe explosion-proof barrier 6 prevents the level meter main body 1 from becoming an ignition source. The pressure-resistant explosion-proof box 7 accommodates the intrinsically safe explosion-proof barrier 6.

The intrinsically safe explosion-proof barrier 6 limits electric energy provided to the level meter main body 1 in both a normal state and a failure state, thereby preventing the level meter main body 1 from serving as an ignition source.

Since the level meter main body 1 has an intrinsically safe explosion-proof structure by the intrinsically safe explosion-proof barrier 6, it is not necessary to have a pressure-resistant explosion-proof structure. Furthermore, since the intrinsically safe explosion-proof barrier 6 is accommodated in the pressure-resistant explosion-proof box 7, it is possible to arrange the barrier at a dangerous place together with the level meter main body 1. Therefore, it is sufficient that an intrinsically safe dedication wiring 50 connecting the intrinsically safe explosion-proof barrier 6 and the level meter main body 1 is short. As a result, the intrinsically safe explosion-proof level meter 100 can simplify design such as wiring design and installation design.

Hereinafter, the intrinsically safe explosion-proof level meter 100 will be described in detail.

Power is supplied to the level meter main body 1 from a DC power supply P via the power supply path 5. Unlike the level meter main body 1 and the power supply path 5, the DC power supply P is disposed in a safe place. The supply of power by the DC power supply P is controlled by a control panel C arranged in a safe place. A large number of wirings (not illustrated) are provided from the control panel C disposed in the safe place to a dangerous place.

A large number of wirings from the control panel C are configured as normal wirings in a safe place and as explosion-proof wirings in a dangerous place. The normal wiring is a wiring in which explosion resistance is not secured. The explosion-proof property is explosion-proof performance that satisfies a standard or standard related to explosion prevention. The explosion-proof wiring is a wiring in which explosion-proof property is ensured. The explosion-proof wiring is, for example, a wiring whose periphery is protected by a steel pipe (not illustrated). In the inside of the joint connected to the steel pipe, the periphery of the wiring is sealed with cement, or a pressure resistant packing is disposed. The power supply path 5 is connected to one explosion-proof wiring E among a large number of wirings from the control panel C.

The power supply path 5 further includes the above-described intrinsically safe dedication wiring 50. The intrinsically safe dedication wiring 50 connects the intrinsically safe explosion-proof barrier 6 and the level meter main body 1. The intrinsically safe dedication wiring 50 is a wiring satisfying a certain standard for preventing electromagnetic induction, electrostatic induction, and interference from other circuits.

The pressure-resistant explosion-proof box 7 further includes an upstream side cable gland 8 and a downstream side cable gland 9. The upstream side cable gland 8 fixes an explosion-proof wiring E connecting the control panel C and the intrinsically safe explosion-proof barrier 6 to the pressure-resistant explosion-proof box 7. That is, the explosion-proof wiring E penetrates the pressure-resistant explosion-proof box 7 and is fixed to the pressure-resistant explosion-proof box 7 by the upstream side cable gland 8. The downstream side cable gland 9 fixes the intrinsically safe dedication wiring 50 connected to the intrinsically safe explosion-proof barrier 6 to the pressure-resistant explosion-proof box 7. That is, the intrinsically safe dedication wiring 50 penetrates the pressure-resistant explosion-proof box 7 and is fixed to the pressure-resistant explosion-proof box 7 by the downstream side cable gland 9. The upstream side cable gland 8 and the downstream side cable gland 9 (hereinafter, collectively referred to as a cable gland 89) each have a pressure-resistant and explosion-proof property and a waterproof property with respect to the pressure-resistant explosion-proof box 7 and wiring.

Figure 3:
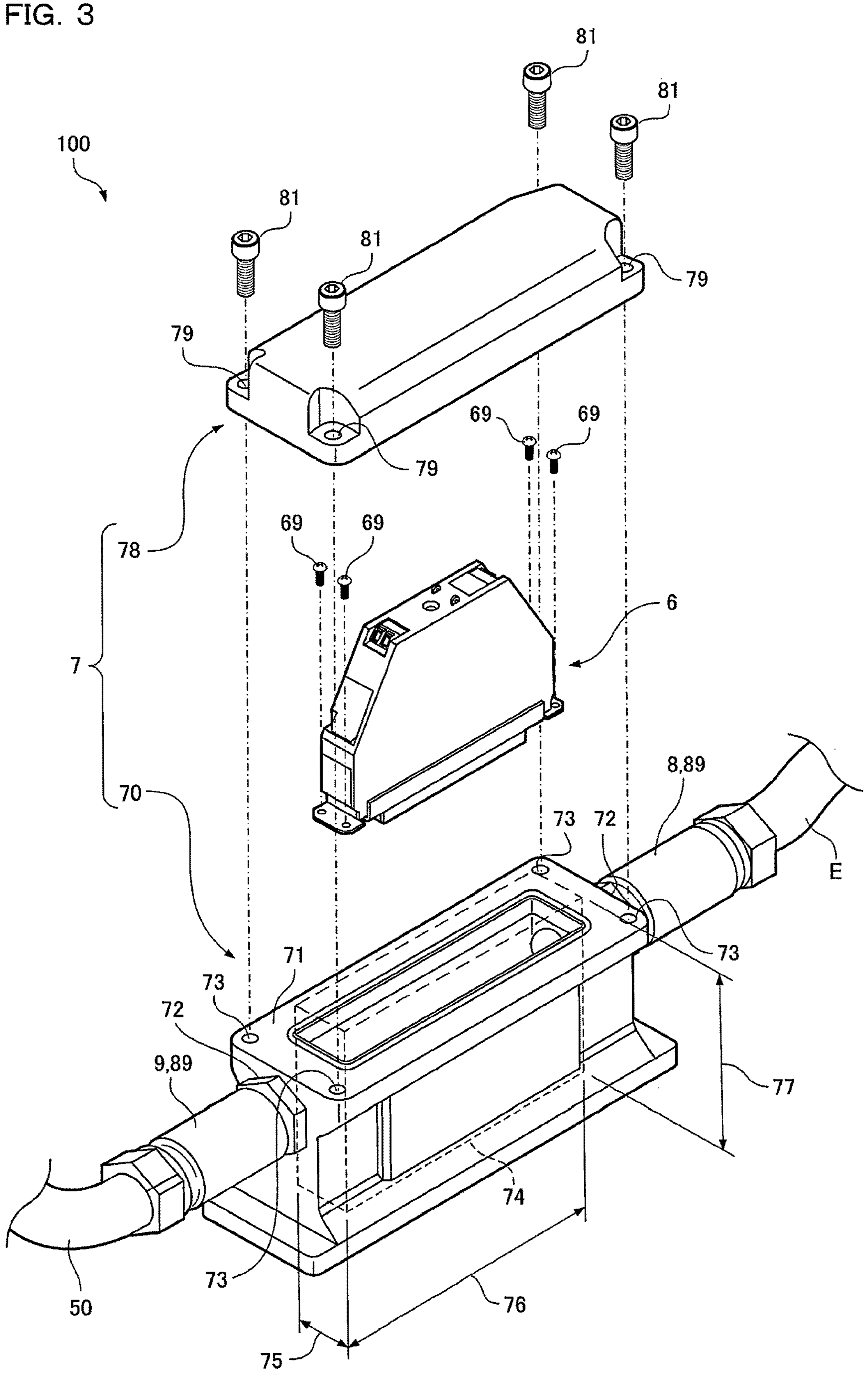
FIG. 3 is an exploded perspective view of a pressure-resistant explosion-proof box and an intrinsically safe explosion-proof barrier.

Hereinafter, the pressure-resistant explosion-proof box 7 will be described in detail with reference to FIG. 3. FIG. 3 is an exploded perspective view of the pressure-resistant explosion-proof box 7 and the intrinsically safe explosion-proof barrier 6.

The pressure-resistant explosion-proof box 7 further includes a box body 70 and a lid 78. The box body 70 has a flange portion 71 protruding outward at a portion in contact with the lid 78.

In the flange portion 71, a portion in contact with the lid 78 has a width necessary for ensuring explosion resistance. Therefore, the box body 70 is thinner than the flange portion 71 except for the flange portion 71. As a result, the level meter of the intrinsically safe explosion-proof barrier 6 can downsize the pressure-resistant explosion-proof box 7.

Portions of the flange portion 71 and the lid 78 in contact with each other are both flat surfaces. Therefore, the pressure-resistant explosion-proof box 7 closes the lid 78 with respect to the box body 70 by the contact of the plane. As a result, unlike the structure in which the lid is closed by screwing, the intrinsically safe explosion-proof level meter 100 can downsize the pressure-resistant explosion-proof box 7.

The box body 70 has two wiring ports 72. Each of the two wiring ports 72 fixes the cable gland 89 by screwing. Each of the two wiring ports 72 is formed with a female screw (not illustrated) for fixing the cable gland 89. Each of the female screws of the two wiring ports 72 has a thread number necessary for ensuring explosion resistance.

The pressure-resistant explosion-proof box 7 has a fixing screw 81. The fixing screw 81 fixes the lid 78 to the box body 70 by screwing. Accordingly, the lid 78 has a through hole 79 through which the fixing screw 81 passes. On the other hand, the box body 70 has a screw hole 73 into which the fixing screw 81 is screwed.

The pressure-resistant explosion-proof box 7 further includes a housing space 74. The housing space 74 accommodates the intrinsically safe explosion-proof barrier 6. The housing space 74 is a substantially rectangular parallelepiped having a length 75, a width 76, and a height 77. In the housing space 74, the length 75 is shorter than the height 77, and the height 77 is shorter than the width 76.

The housing space 74, which is shorter in order of the length 75, the height 77, and the width 76, has a thin shape along the intrinsically safe explosion-proof barrier 6 which is formed of a substrate. Therefore, the intrinsically safe explosion-proof level meter 100 can downsize the pressure-resistant explosion-proof box 7.

The direction in which the flange portion 71 protrudes outward is the direction of the length 75. Therefore, the box body 70 becomes thin at the length of the width 76. As a result, the level meter having the intrinsically safe explosion-proof barrier 6, which is an intrinsically safe-related device, can downsize the pressure-resistant explosion-proof box 7.

The housing space 74 reaches not only the inside of the box body 70 but also the inside of the lid 78. Therefore, the intrinsically safe explosion-proof barrier 6 accommodated in the housing space 74 is protected by the box body 70 and the lid 78. The inside of the lid 78 not only accommodates the upper part of the intrinsically safe explosion-proof barrier 6, but also accommodates the wiring.

The intrinsically safe explosion-proof barrier 6 is fixed to the bottom of the box body 70 with small screws 69 in the housing space 74. The intrinsically safe explosion-proof barrier 6 is fixed to the bottom of the box body 70, thereby allowing electrical grounding via the box body 70. Therefore, as the intrinsically safe explosion-proof barrier 6, a non-insulation type barrier requiring electrical grounding may also be employed. In the case of electrical grounding, although not illustrated, a ground wire is connected to the box body 70. The ground wire is explosion-proof in a dangerous place, and is electrically grounded in a safe place. Further, the intrinsically safe explosion-proof barrier 6 is not limited to a non-insulation type barrier, and may be any barrier that prevents the level meter main body 1 from becoming an ignition source.

Figure 4:
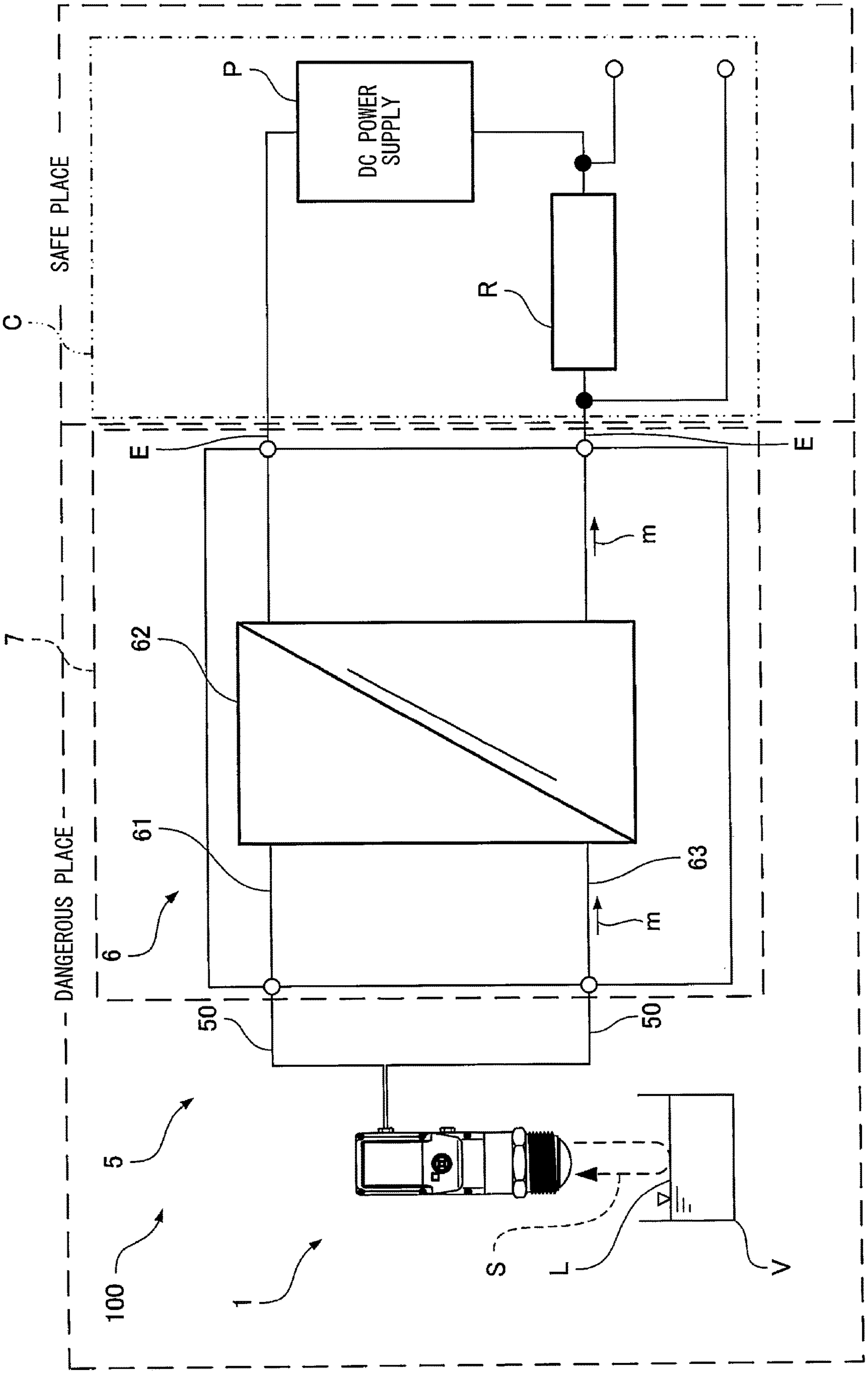
FIG. 4 is a circuit diagram in a case where a two-wire/two-wire insulation type barrier is adopted as the intrinsically safe explosion-proof barrier.
Figure 5:
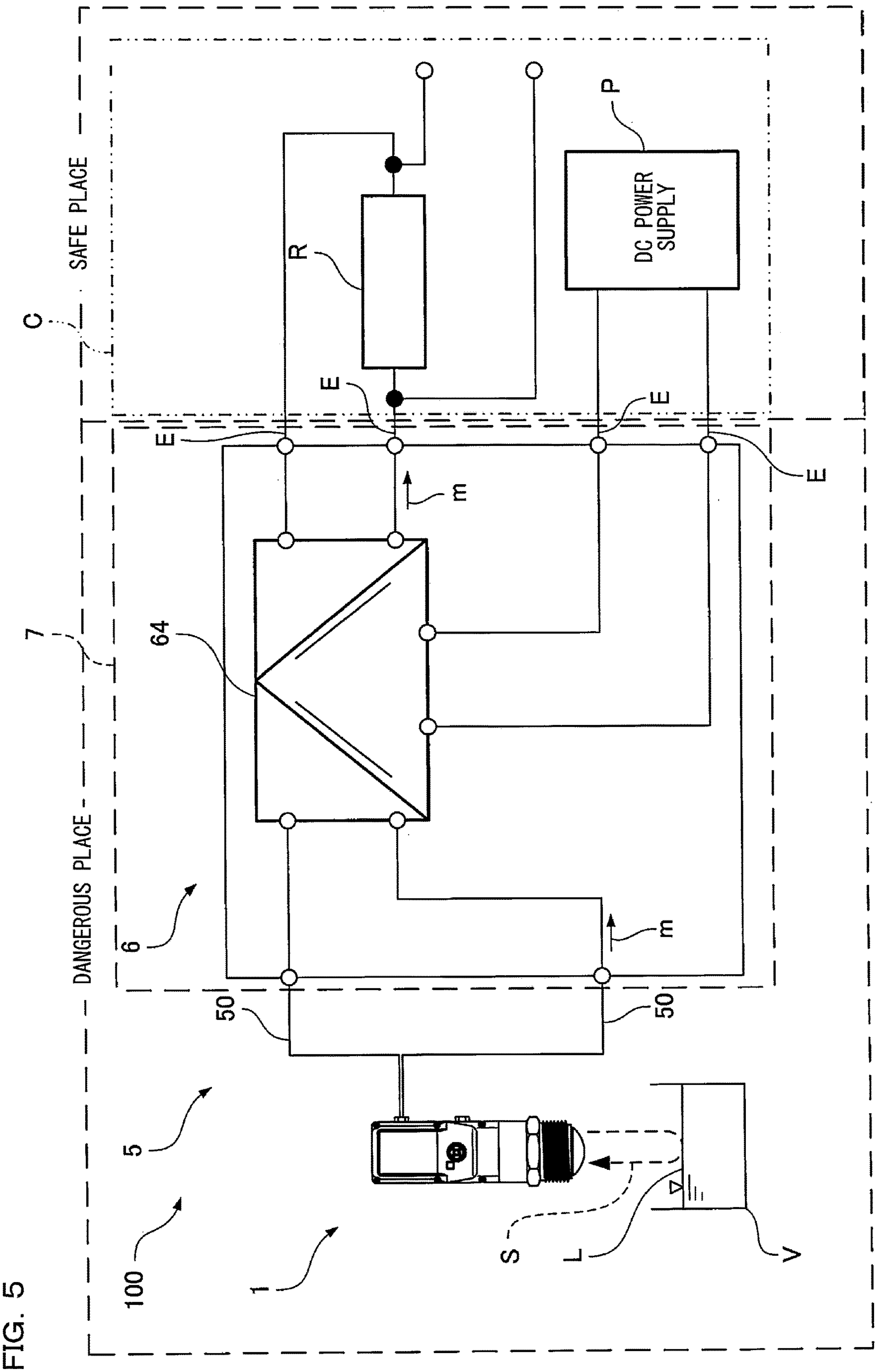
FIG. 5 is a circuit diagram in a case where a four-wire/two-wire insulation type barrier is adopted as an intrinsically safe explosion-proof barrier.
Figure 6:
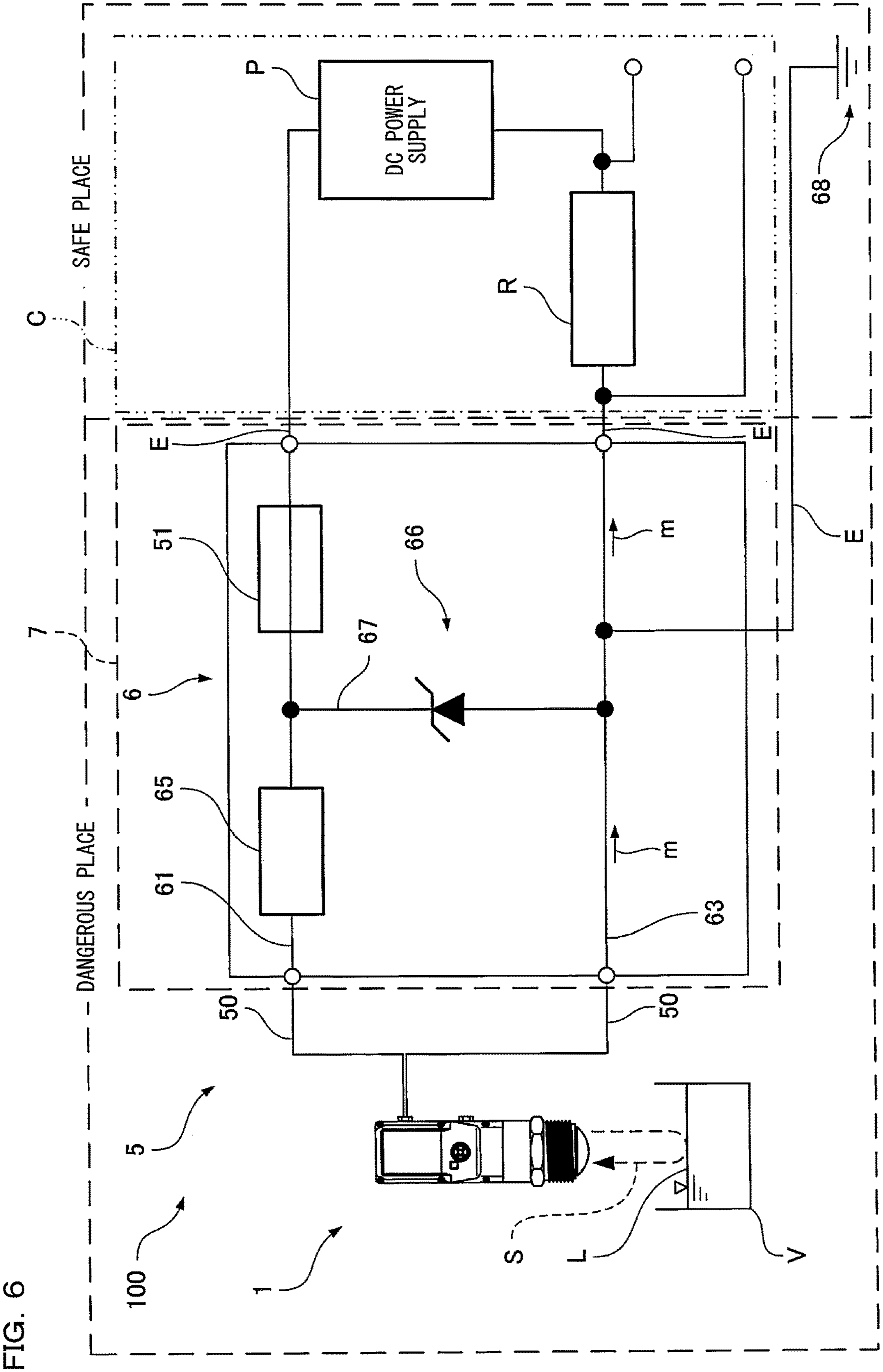
FIG. 6 is a circuit diagram in a case where a two-wire/two-wire non-insulation type barrier is adopted as an intrinsically safe explosion-proof barrier.
Figure 7:
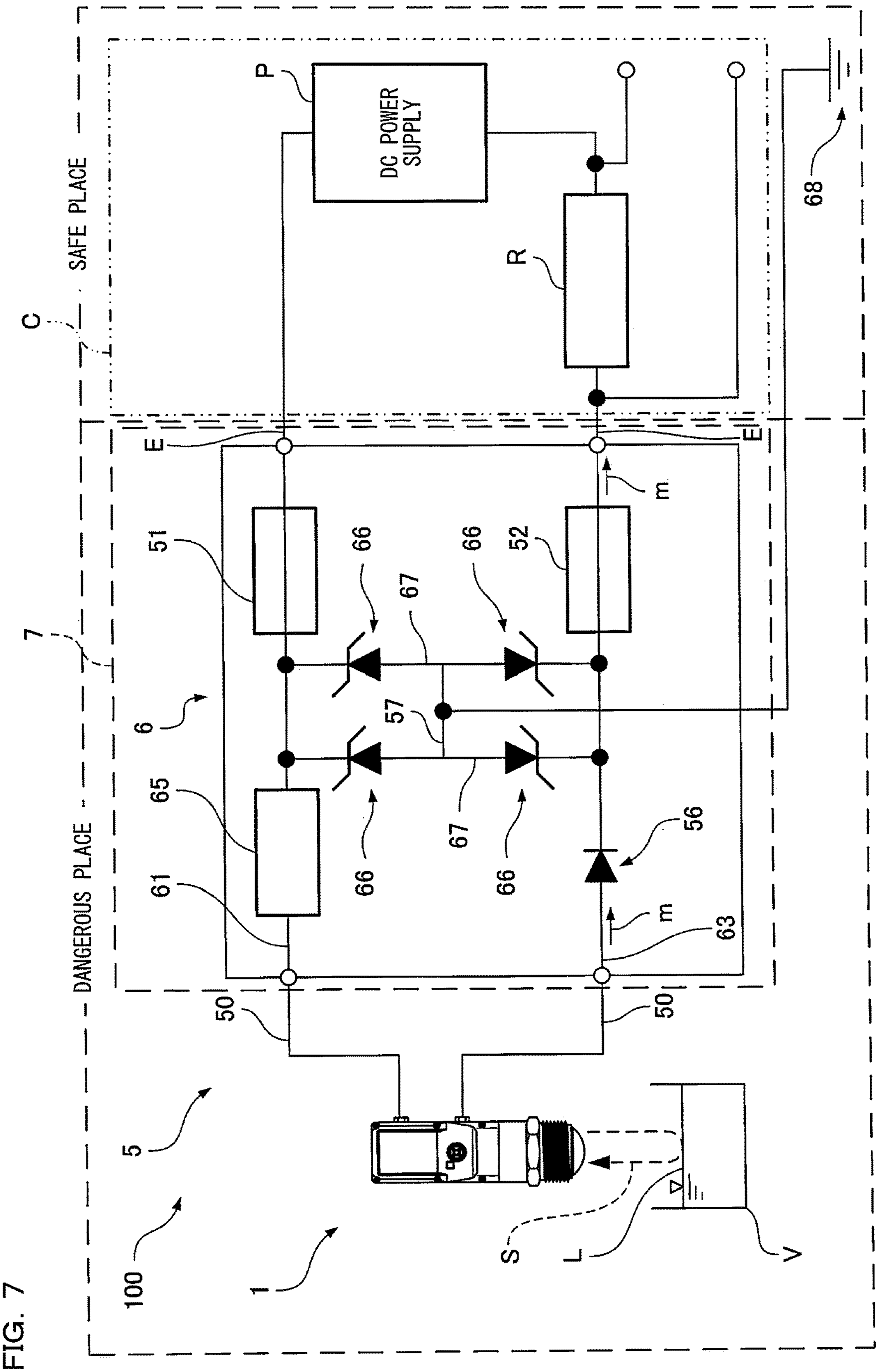
FIG. 7 is a circuit diagram in a case where

Hereinafter, the type of the intrinsically safe explosion-proof barrier 6 will be described in detail with reference to FIGS. 4 to 7. FIG. 4 is a circuit diagram in a case where a two-wire/two-wire insulation type barrier in which two wires are provided on a safe place side and two wires are provided on a dangerous place side is employed as the intrinsically safe explosion-proof barrier 6. FIG. 5 is a circuit diagram in a case where a four-wire/two-wire insulation type barrier in which four wires are provided on a safe place side and two wires are provided on a dangerous place side is employed as the intrinsically safe explosion-proof barrier 6. FIG. 6 is a circuit diagram in a case where a two-wire/two-wire non-insulation type barrier in which two wires are provided on a safe place side and two wires are provided on a dangerous place side is employed as the intrinsically safe explosion-proof barrier 6. FIG. 7 is a circuit diagram in a case where FIG. 6 is modified.

As illustrated in FIGS. 4, 6 and 7, the intrinsically safe explosion-proof barrier 6 is a two-wire barrier. Here, the explosion-proof wiring E from the control panel C is a two-wire type. Therefore, since the intrinsically safe explosion-proof barrier 6 is a two-wire type similarly to the explosion-proof wiring E from the control panel C, the internal configuration of the pressure-resistant explosion-proof box 7 is simplified. Specifically, in the pressure-resistant explosion-proof box 7, the number of terminal blocks to be used is four in total, and the wiring is simplified. As a result, the intrinsically safe explosion-proof level meter 100 can simplify the configuration of the power supply path 5.

As illustrated in FIGS. 4 and 5, the intrinsically safe explosion-proof barrier 6 is an insulation type barrier. Therefore, the intrinsically safe explosion-proof barrier 6 does not require electrical grounding.

As illustrated in FIG. 4, the intrinsically safe explosion-proof barrier 6 is of the insulating type, since it has a two-wire/two-wire insulation circuit 62. The two-wire/two-wire insulation circuit 62 supplies power from the DC power supply P to the two-wire level meter main body 1, and transmits a measurement value signal m superimposed on the power supply line by the two-wire level meter main body 1 to the DC power supply P side. The two-wire/two-wire insulation circuit 62 includes, for example, an insulation transformer and an insulation amplifier. Power from the DC power supply P is supplied to the two-wire level meter main body 1 by the insulation transformer. The measurement value signal m superimposed on the power supply line is superimposed on the power supply line on the DC power supply P side via the insulation amplifier. As a result, the two-wire/two-wire insulation circuit 62 is a circuit that insulates the power supplied from the DC power supply P to the two-wire type level meter main body 1 and the communication information and the analog signal superimposed by the two-wire type level meter main body 1, but generates an output as if the power is through-transmitted between the two-wire/two-wire insulation circuit 62. An external resistor R is arranged between the intrinsically safe explosion-proof barrier 6 and the DC power supply P. The external resistor R extracts the measurement value signal m from the level meter main body 1 as a voltage signal.

As illustrated in FIG. 5, the intrinsically safe explosion-proof barrier 6 is of the insulating type, since it has a four-wire/two-wire insulation circuit 64. The four-wire/two-wire insulation circuit 64 has a function as a distributor that supplies power from the DC power supply P to the two-wire level meter main body 1, and separates the measurement value signal m such as analog information and communication information from the two-wire level meter main body 1 from the power supply line and transmits the signal to the external resistor R side. The path from the intrinsically safe explosion-proof barrier 6 to the DC power supply P and the path from the intrinsically safe explosion-proof barrier 6 to the external resistor R are separate. That is, the four-wire/two-wire insulation circuit 64 also functions as a distributor that separates the supply of power and the transmission of the measurement value signal m.

As illustrated in FIGS. 6 and 7, the intrinsically safe explosion-proof barrier 6 is a Zener barrier. Since the intrinsically safe explosion-proof barrier 6 is a Zener barrier, the configuration is simplified. Therefore, the intrinsically safe explosion-proof level meter 100 can simplify the configuration of the power supply path 5.

As illustrated in FIG. 6, the intrinsically safe explosion-proof barrier 6 is a Zener barrier since it has a Zener diode 66. The intrinsically safe explosion-proof barrier 6 is configured such that power and signals are through-transmitted between the two wires on the safe place side and the two wires on the dangerous place side in a non-isolated manner. The intrinsically safe explosion-proof barrier 6 further includes an internal resistor 65 and a first fuse 51. The internal resistor 65 and the first fuse 51 are provided on one wire 61 of the two-wire type. The Zener diode 66 is provided in a connection path 67 that connects one wire 61 and the other wire 63. The connection path 67 is connected between the internal resistor 65 and the first fuse 51 on one wire 61. The intrinsically safe explosion-proof barrier 6 is connected to an electrical ground 68 from the other wire 63 via a ground wire. The electrical ground 68 is a type A ground. The electrical ground 68 is connected in a safe place. The safe place where the electrical ground 68 is connected does not need to be a far safe place where the control panel C is disposed, and if it is a safe place, it may be a safe place near the intrinsically safe explosion-proof barrier 6.

As illustrated in FIG. 7, the intrinsically safe explosion-proof barrier 6 is a Zener barrier since it has a Zener diode 66. The intrinsically safe explosion-proof barrier 6 further includes a general-purpose diode 56 and a second fuse 52. The general-purpose diode 56 and the second fuse 52 are provided on the other wire 63. The connection path 67 is connected between the general-purpose diode 56 and the second fuse 52. The number of connection paths 67 is 2, and the number of Zener diodes 66 is 4. Two Zener diodes 66 are provided in each connection path 67. The electrical ground 68 is connected from a path 57 that connects the two connection paths 67 to each other. The path 57 connects the two Zener diodes 66 of each connection path 67.

Figure 8:
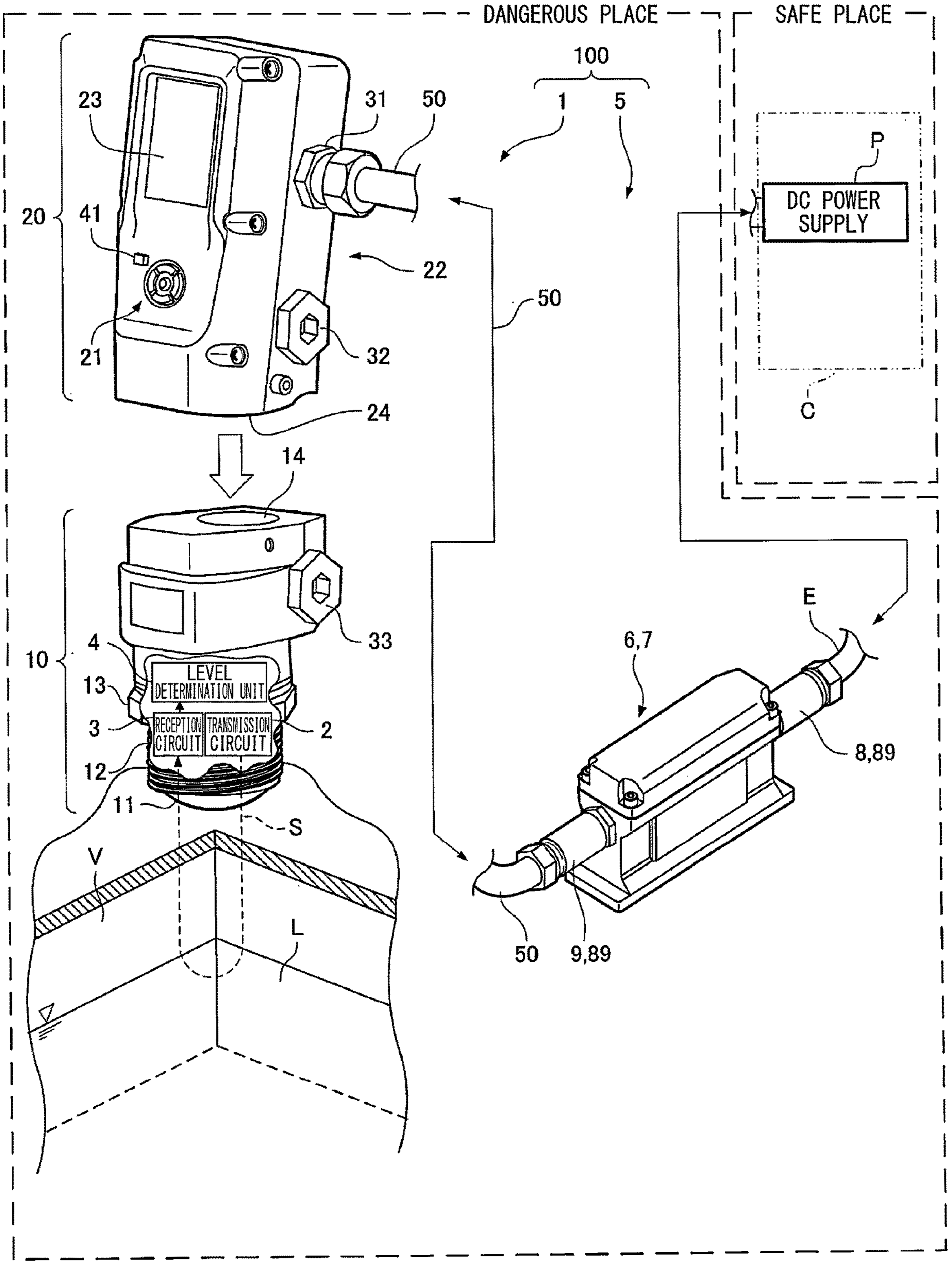
FIG. 8 is a perspective view of a state immediately before the level meter main body is integrally used.
Figure 9:
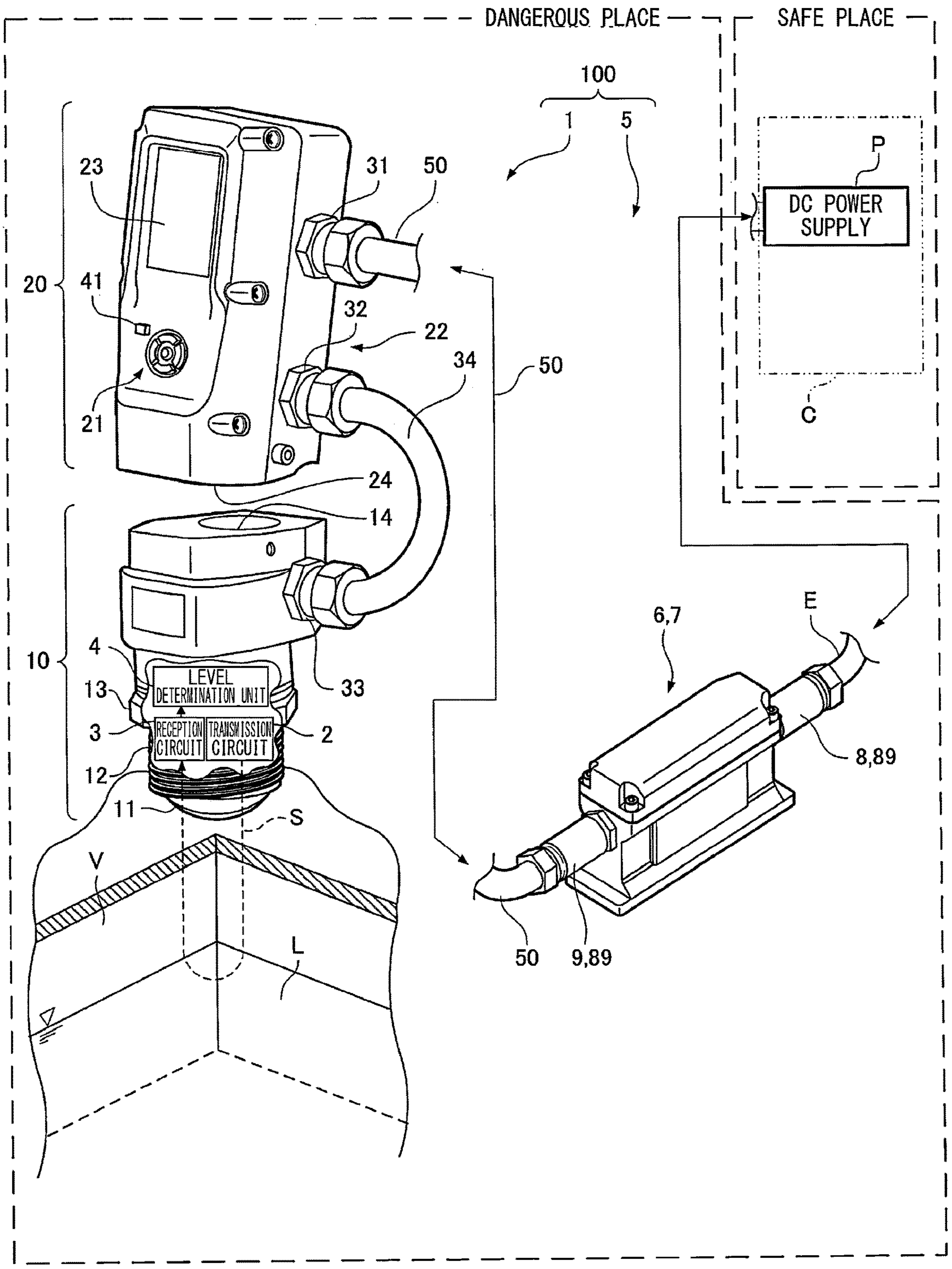
FIG. 9 is a perspective view of a state in which the level meter main body is used separately.

Hereinafter, the level meter main body 1 will be described in detail with reference to FIGS. 8 and 9. FIG. 8 is a perspective view of a state immediately before the level meter main body 1 is integrally used. FIG. 9 is a perspective view of a state in which the level meter main body 1 is used separately.

As illustrated in FIGS. 8 and 9, the level meter main body 1 further includes a sensor housing 10. The sensor housing 10 accommodates the transmission circuit 2 and the reception circuit 3. The display portion 20 is detachably connected to the sensor housing 10.

By detachably connecting the display portion 20 to the sensor housing 10, the intrinsically safe explosion-proof level meter 100 can use the level meter main body 1 integrally or separately at a dangerous place.

In the display portion 20 and the sensor housing 10, attachment and detachment means a physical state, that is, physical attachment and detachment. In addition, in the display portion 20 and the sensor housing 10, connection means electrical connection. Therefore, the state in which the display portion 20 and the sensor housing 10 are detachably connected means a state in which they are electrically connected while being physically attached or detached.

The display portion 20 further includes an attachable/detachable portion 24, a first connecting portion 31, and a second connecting portion 32. The attachable/detachable portion 24 is detachably attached to the sensor housing 10. The first connecting portion 31 fixes the intrinsically safe dedication wiring 50 penetrating the display portion 20 to the display portion 20, and is, for example, a cable gland. In a case where the display portion 20 and the sensor housing 10 are used separately, the second connecting portion 32 fixes a wiring connecting the display portion 20 and the sensor housing 10 to the display portion 20. In a case where the display portion 20 and the sensor housing 10 are directly connected, the second connecting portion is closed with a plug because it is not used. The second connecting portion 32 fixes a wiring connecting the display portion 20 and the sensor housing 10 in a waterproof manner by, for example, a cable gland.

The sensor housing 10 also accommodates the level determination unit 4. The sensor housing 10 is located closer to the object L than the display portion 20. The sensor housing 10 includes a transmission window 11, an attachment screw portion 12, an attachment portion 13, a third connecting portion 33, and an attached/detached portion 14 in this order from the side closer to the object L. The attachment screw portion 12 is formed with a male screw. Therefore, the attachment screw portion 12 is attached by screwing to a through hole (not illustrated) in which a female screw is formed in the container V. The attachment portion 13 is a nut-shaped member protruding radially outward. In a case where the display portion 20 and the sensor housing 10 are used separately, the third connecting portion 33 fixes a wiring connecting the display portion 20 and the sensor housing 10 to the sensor housing 10. In a case where the display portion 20 and the sensor housing 10 are directly connected, the second connecting portion is closed with a plug because it is not used. The third connecting portion 33 fixes a wiring connecting the display portion 20 and the sensor housing 10 in a waterproof manner by, for example, a cable gland. The attached/detached portion 14 is attached to and detached from the attachable/detachable portion 24.

As illustrated in FIG. 8, when the level meter main body 1 is used integrally, the display portion 20 and the sensor housing 10 supply power and transmit a signal via the attachable/detachable portion 24 and the attached/detached portion 14. On the other hand, as illustrated in FIG. 9, in a case where the level meter main body 1 is used separately, the display portion 20 and the sensor housing 10 supply power and transmit a signal via an intrinsically explosion-proof cable 34 fixed by the second connecting portion 32 and the third connecting portion 33.

The measurement signal S is a signal transmitted from the transmission circuit 2, then reflected by the object L through the transmission window 11, and then received by the reception circuit 3 through the transmission window 11. The measurement signal S is not particularly limited as long as it is such a signal, and is, for example, a radio wave.

The configurations of the transmission circuit 2, the reception circuit 3, and the level determination unit 4 are not particularly limited, but are, for example, sensors. The sensor includes one or a plurality of integrated circuits (IC) and a microcomputer as necessary. The IC may be a monolithic microwave integrated circuit (MMIC) or an antenna-integrated MMIC.

The sensor is set according to a method of measuring the level of the object L. The method of measuring the level of the object L is a time of flight (TOF) method, a radar method, or the like. In the radar method, a frequency modulated continuous wave (FMWC) or the like is used.

The level determination unit 4 calculates the distance from the transmission circuit 2 and the reception circuit 3 to the upper surface of the object L. The level determination unit 4 determines a level that is the position of the upper surface of the object L from the calculated distance and the information on the container V.

The object L is not particularly limited as long as it is stored in the container V, and is, for example, liquid or powder. The level of the object L is the position of the upper surface of the object L.

Figure 10:
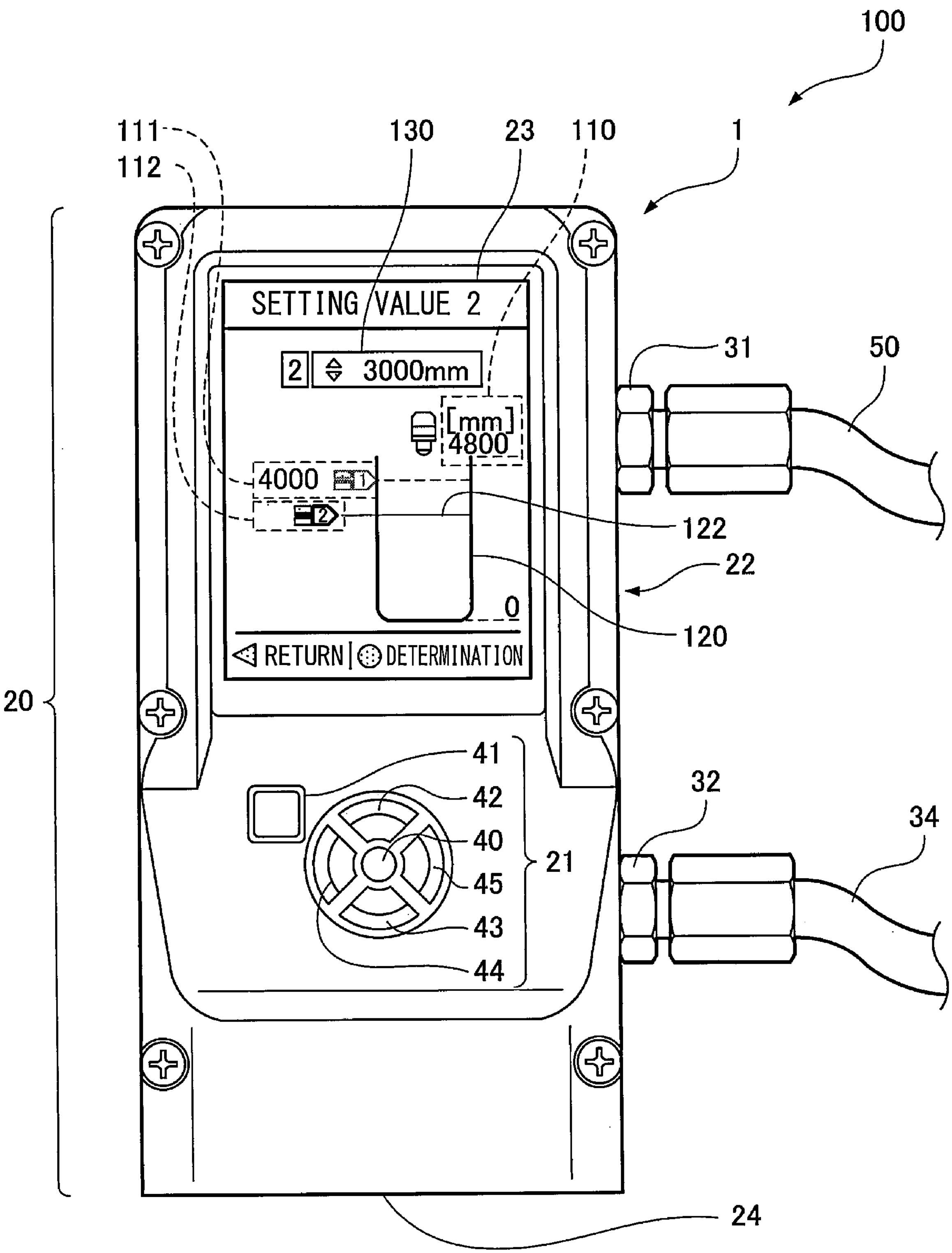
FIG. 10 is a front view of a display portion and an operation switch.

Hereinafter, a configuration for operation and display by the level meter main body 1 will be described with reference to FIG. 10. FIG. 10 is a front view of the display portion 20 and the operation switch 21.

As illustrated in FIG. 10, the display portion 20 further includes a display portion housing 22 exposed to the outside. The operation switch 21 includes push buttons 40 to 45 provided on the display portion housing 22. By providing the push buttons 40 to 45 on the display portion housing 22 exposed to the outside, the push buttons 40 to 45 can be directly pressed from the outside. Therefore, unlike the pressure-resistant explosion-proof structure, the operation switch 21 is not covered with a pressure-resistant explosion-proof housing, and thus is easily operated. As a result, the intrinsically safe explosion-proof level meter 100 can improve operability by the user.

The display portion 20 further includes a display 23 provided in the display portion housing 22. By providing the display 23 in the display portion housing 22 exposed to the outside, the display 23 can be directly viewed from the outside. Therefore, unlike the pressure-resistant explosion-proof structure, the display 23 is not covered with the pressure-resistant explosion-proof housing, and thus is easily visually recognized. As a result, the intrinsically safe explosion-proof level meter 100 can improve visibility by the user.

The push buttons 40 to 45 include a menu key 41, direction keys 42 to 45, and a determination key 40. When the menu key 41 is pressed, a menu for operation is displayed on the display 23. When the direction keys 42 to 45 are pressed, an input corresponding to the pressed direction is input. The direction keys 42 to 45 include an up key 42, a down key 43, a left key 44, and a right key 45. The determination key 40 is pressed to decide the input content.

Hereinafter, an example of operation and display by the level meter main body 1 will be described with reference to FIGS. 10 and 11. FIG. 11 is a display screen of the display 23 for displaying the determined level.

As illustrated in FIG. 10, the display 23 displays, as operation screens, items already set and items to be set from now.

The already set item is a height 110 of the container as the information of the container V and one threshold (hereinafter, a first threshold) 111 of the thresholds for the determined level. The already set height 110 of the container is 4800 mm. The first threshold 111 that has already been set is 4000 (mm).

In a case where it is desired to correct an item that has already been set, the left key 44 is pressed to return to an operation screen (not illustrated) for setting the first threshold 111. By further pressing the left key 44, the screen returns to an operation screen (not illustrated) for setting the height 110 of the container.

As illustrated in FIG. 10, the item to be set from now is another threshold (second threshold) 112 of the thresholds for the determined level. As the second threshold 112 to be set from now, 3000 mm is displayed in a selection field 130. By pressing the up key 42 or the down key 43, the numerical value of the selection field 130 rises or falls. A horizontal line 122 inside a container 120 displayed as an image moves up and down corresponding to the rising and falling of the numerical value in the selection field 130. After a numerical value desired to be set as the second threshold 112 is displayed in the selection field 130, the determination key 40 is pressed to set the numerical value in the selection field 130 as the second threshold 112.

Similarly, among the thresholds for the determined level, unset thresholds are sequentially set by operating the operation switch 21. The set information and threshold of the container V are setting information. After all the settings are completed, the level of the object L is measured.

As illustrated in FIG. 11, on the display 23, the determined level of 1500 mm is displayed on an auxiliary display portion 150. A bar display 162 overlapping the container 160 displayed as an image moves up and down corresponding to the determined level. The bar display 162 points to the color gauge 170 adjacent to the container 160 displayed as an image. The color gauge 170 is divided into level ranges 171 to 175 of different colors depending on a set threshold. One of the level ranges 171 to 175 (the level range 174 in the example of FIG. 11) is indicated by the bar display 162.

The above embodiment is illustrative in all respects and is not restrictive. The scope of the present invention is indicated not by the above description but by the claims, and it is intended that meanings equivalent to the claims and all modifications within the scope are included. Among the configurations described in the above embodiment, configurations other than the configuration described as one aspect of the present invention in “means for solving problems” are arbitrary configurations, and can be appropriately deleted and changed.

The present invention provides an intrinsically safe explosion-proof level meter and has industrial applicability.

What is claimed is:

1. An intrinsically safe explosion-proof level meter that measures a level of an object stored in a container, comprising:

- a level meter main body; and
- a power supply path that supplies power to the level meter main body and transmits a signal indicating a level from the level meter main body,
- wherein the level meter main body includes:
  - a transmission circuit that transmits a measurement signal for measuring the level of the object;
  - a reception circuit that receives the measurement signal reflected by the object;
  - a level determination unit that determines the level based on the measurement signal received by the reception circuit and information on the container;
  - an operation switch that receives an input operation of setting information on information of the container; and
  - a display configured to display the level determined by the level determination unit, and
- the power supply path includes:
  - an intrinsically safe explosion-proof barrier that prevents the level meter main body from becoming an ignition source; and
  - a pressure-resistant explosion-proof box that accommodates the intrinsically safe explosion-proof barrier.

2. The intrinsically safe explosion-proof level meter according to claim 1, wherein

- the pressure-resistant explosion-proof box includes a box body and a lid, and
- the box body has a flange portion protruding outward at a portion in contact with the lid.

3. The intrinsically safe explosion-proof level meter according to claim 2, wherein

- the pressure-resistant explosion-proof box further includes a housing space that accommodates the intrinsically safe explosion-proof barrier,
- the housing space is a substantially rectangular parallelepiped having a length, a width, and a height, and
- the housing space has the length shorter than the height and the height shorter than the width.

4. The intrinsically safe explosion-proof level meter according to claim 2, wherein

- the level meter main body further includes a sensor housing that accommodates the transmission circuit and the reception circuit, and
- the display is detachably connected to the sensor housing.

5. The intrinsically safe explosion-proof level meter according to claim 2, wherein

- the display includes a display housing exposed to an outside and a display provided in the display housing,
- the intrinsically safe explosion-proof barrier and the level meter main body are connected by an intrinsically safe dedication wiring penetrating the display housing and the pressure-resistant explosion-proof box,
- the intrinsically safe dedication wiring is fixed to each of the display housing and the pressure-resistant explosion-proof box via a cable gland, and
- the operation switch includes a push button provided in the display housing.

6. The intrinsically safe explosion-proof level meter according to claim 1, wherein

- the pressure-resistant explosion-proof box further includes a housing space that accommodates the intrinsically safe explosion-proof barrier,
- the housing space is a substantially rectangular parallelepiped having a length, a width, and a height, and
- the housing space has the length shorter than the height and the height shorter than the width.

7. The intrinsically safe explosion-proof level meter according to claim 1, wherein

- the pressure-resistant explosion-proof box includes a box body and a lid, and
- the box body has a screw portion that is screwed at a portion in contact with the lid.

8. The intrinsically safe explosion-proof level meter according to claim 1, wherein

- the level meter main body is a two-wire type that superimposes information indicating a level determined by the level determination unit on a power supply line and outputs the superimposed information, and
- the intrinsically safe explosion-proof barrier is a two-wire/two-wire type barrier in which wiring on a safe place side is two wires and wiring on a dangerous place side is two wires.

9. The intrinsically safe explosion-proof level meter according to claim 8, wherein the intrinsically safe explosion-proof barrier is an insulation-type through-transmission barrier.

10. The intrinsically safe explosion-proof level meter according to claim 8, wherein the intrinsically safe explosion-proof barrier has a Zener diode for voltage limitation, a fuse for current limitation, and a ground line, and the ground line is installed in a safe place.

11. The intrinsically safe explosion-proof level meter according to claim 1, wherein the intrinsically safe explosion-proof barrier is an insulation-type through-transmission barrier.

12. The intrinsically safe explosion-proof level meter according to claim 1, wherein the level meter main body further includes a sensor housing that accommodates the transmission circuit and the reception circuit, and the display is detachably connected to the sensor housing.

13. The intrinsically safe explosion-proof level meter according to claim 1, wherein the display includes a display housing exposed to an outside and a display provided in the display housing, the intrinsically safe explosion-proof barrier and the level meter main body are connected by an intrinsically safe dedication wiring penetrating the display housing and the pressure-resistant explosion-proof box, the intrinsically safe dedication wiring is fixed to each of the display housing and the pressure-resistant explosion-proof box via a cable gland, and the operation switch includes a push button provided in the display housing.

14. The intrinsically safe explosion-proof level meter according to claim 1, wherein the operation switch receives a setting operation on a threshold for a level determined by the level determination unit, and the level meter main body further includes an indicator lamp that displays a state of the level based on a level determined by the level determination unit and a threshold set.

* * * * *